United States Patent
Rose et al.

(10) Patent No.: US 9,754,186 B2
(45) Date of Patent: Sep. 5, 2017

(54) VISUAL FEATURE EXTRACTION METHODS AND SYSTEMS

(71) Applicant: LEIDOS INNOVATIONS TECHNOLOGY, INC., Gaithersburg, MD (US)

(72) Inventors: William John Rose, Wayne, PA (US); Corey Brendan Hart, Philadelphia, PA (US)

(73) Assignee: LEIDOS INNOVATIONS TECHNOLOGY, INC., Gaithersburg, MD (US)

( * ) Notice: Subject to any disclaimer, the term of this patent is extended or adjusted under 35 U.S.C. 154(b) by 137 days.

(21) Appl. No.: 14/167,536

(22) Filed: Jan. 29, 2014

(65) Prior Publication Data

US 2015/0213327 A1    Jul. 30, 2015

(51) Int. Cl.
G06K 9/62 (2006.01)
G06T 15/08 (2011.01)
G06K 9/00 (2006.01)
G06T 7/11 (2017.01)
G06T 7/143 (2017.01)

(52) U.S. Cl.
CPC .......... *G06K 9/623* (2013.01); *G06K 9/0014* (2013.01); *G06K 9/00147* (2013.01); *G06K 9/624* (2013.01); *G06K 9/6247* (2013.01); *G06T 7/11* (2017.01); *G06T 7/143* (2017.01); *G06T 2207/10088* (2013.01); *G06T 2207/30004* (2013.01)

(58) Field of Classification Search
CPC .... A45B 2200/1018; A45B 2200/1027; A45B 25/00; G06K 9/6215; G06K 9/623; G06T 2207/10088; G06T 2207/30004; G06T 7/0081; G06T 7/0087
See application file for complete search history.

(56) References Cited

U.S. PATENT DOCUMENTS

| | | | |
|---|---|---|---|
| 7,069,258 B1 * | 6/2006 | Bothwell | G06N 7/06 706/12 |
| 2003/0002731 A1 * | 1/2003 | Wersing | G06K 9/4628 382/161 |
| 2006/0084858 A1 * | 4/2006 | Marks | A61B 5/16 600/407 |
| 2013/0184558 A1 * | 7/2013 | Gallant | A61B 5/0042 600/409 |

OTHER PUBLICATIONS

Stanford Goldman, "Information Theory," Prentice-Hall Inc., Sep. 1953, Chapter 9 Section 9.1.*

(Continued)

*Primary Examiner* — Sing-Wai Wu
(74) *Attorney, Agent, or Firm* — Oblon, McClelland, Maier & Neustadt, L.L.P.

(57) ABSTRACT

Systems and methods for image processing are disclosed. For example, a system for processing images includes voxel-ranking circuitry that ranks individual voxels using voxel data derived from physiological responses resulting from exposure to a plurality of corresponding baseline stimulus images, and voxel selection circuitry that selects a portion of the set of ranked voxels based on their rank.

19 Claims, 8 Drawing Sheets

(56) References Cited

OTHER PUBLICATIONS

Juan Manuel Ramirez Cortes and Jingqi Ao, "Feature extraction and classification of a two-class fMRI experiment using principal component analysis, LDA and SVM," Reporte Tecnico No. RT-0590, RT R35 2009, Aug. 20, 2009.*
Simon Haykin, "Adaptive Filter Theory", 1996, Prentice-Hall Inc., Third Edition, p. 100-105 and 176-186.*
Miyawaki et al., "Visual Image Reconstruction from Human Brain Activity using a Combination of Multiscale Local Image Decoders," *Neuron*, vol. 60, pp. 915-929, Dec. 11, 2008.
Haxby et al., "Distributed and Overlapping Representations of Faces and Objects in Ventral Temporal Cortex," *Science*, vol. 293, pp. 2425-2430, Sep. 28, 2001.
Makeig et al., "Independent Component Analysis of Electroencephalographic Data," Published in: Touretzky et al., *Advances in Neural Information Processing Systems 8*, pp. 145-151, 1996.
Kuo et al., "Variable Selection for Regression Models," *Sankhyā: The Indian Journal of Statistics* (Special Issue on Bayesian Analysis), vol. 60, Series B, Part 1, pp. 65-81, 1998.

* cited by examiner

VISUAL FEATURE EXTRACTION METHODS AND SYSTEMS

BACKGROUND

When a human is exposed to practically any form of stimulus, the human brain reacts in a physical manner. A variety of techniques have been proposed for decoding these reactions, with many of the techniques dependent on the form of the neural data encoded. For decoding of human neural activity, functional MRI (fMRI) analysis of BOLD (Blood oxygen level dependent) activations has resulted in the ability to assess stimulus evoked activity on a fine (millimeter) spatial scale. The density of information in this approach has resulted in a wealth of analytical studies and attempts at neural decoding.

One of the first attempts at statistically sophisticated fMRI decoding of neural activity in response to visual stimuli, known as multivariate pattern analysis (MVPA), relied on the fact that different stimuli will induce neural responses with spatially distinct patterns of activity and that classifier and machine learning algorithms can operate to identify optimal decision boundaries for appropriate classification of stimulus categories. Later studies transformed sets of stimulus images and fMRI activity into a common vector space where fMRI activity can not only be used to identify which stimulus images have been presented, but can reconstruct those images based on putative features encoded by particular voxels. Unfortunately, such techniques are highly computationally intensive.

SUMMARY

Various aspects and embodiments of the invention are described in further detail below.

In an embodiment, a system for processing images includes voxel-ranking circuitry that ranks individual voxels using voxel data derived from physiological responses resulting from exposure to a plurality of corresponding baseline stimulus images, and voxel selection circuitry that selects a portion of the set of ranked voxels based on their rank.

In another embodiment, a method for processing images includes ranking individual voxels using voxel data derived from physiological responses resulting from exposure to a plurality of corresponding baseline stimulus images, and voxel selection circuitry that selects a portion of the set of ranked voxels based on their rank.

BRIEF DESCRIPTION OF THE DRAWINGS

Various embodiments of this disclosure that are proposed as examples will be described in detail with reference to the following figures, wherein like numerals reference like elements, and wherein:

FIGS. 4-11B depict experimental results of the systems and methods of FIGS. 1-3.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

A "voxel" is a three dimensional pixel residing at a particular (Y, Y, Z) coordinate and having one or more descriptive values, such as intensity. Raw functional MRI (fMRI) image data of the human brain can now be characterized by a large number of voxels. For example, a first voxel data set examined by scientist (Miyawaki et al.) includes data sets from three subjects and contains voxel activity from 18,063 voxels recorded across the entirety of a human occipital lobe upon exposure to a set of abstract images. See, Miyawaki, Y., Uchida, H., Yamashita, O., Sato, M., Morito, Y., Tanabe, H. C., Sadato, N., and Kamitani, Y. (2008), *Visual image reconstruction from human brain activity using a combination of multiscale local image decoders, Neuron* 60, 915-29, the content of which is incorporated by reference in its entirety. The raw data from Miyawaki et al., while not necessary for the understanding or enablement of the disclosed methods and systems, is available at http://www.cns.atr.jp/dni/en/downloads/fmri-data-set-for-visual-image-reconstruction/

A second voxel data set (Haxby et al.) was derived using forty images broken into eight distinct image classes (faces, houses, cats, bottles, scissors, shoes, chairs, and random noise patterns) and includes the resulting activity from 40,000 voxels of the face fusiforum area in a single subject. See, Haxby, J. V., Gobbini, M. I., Furey, M. L., Ishai, A., Schouten, J. L., and Pietrini, P. (2001), *Distributed and overlapping representations of faces and objects in ventral temporal cortex, Science* 293, 2425-2430, the content of which is incorporated by reference in its entirety. The raw data from Haxby et al., while not necessary for the understanding or enablement of the disclosed methods and systems, is available at http://dev.pymvpa.org/datadb/haxby2001.html.

In order to better understand and analyze voxel data, it is helpful to eliminate those voxels that contribute little or no useful information.

Figure 1:
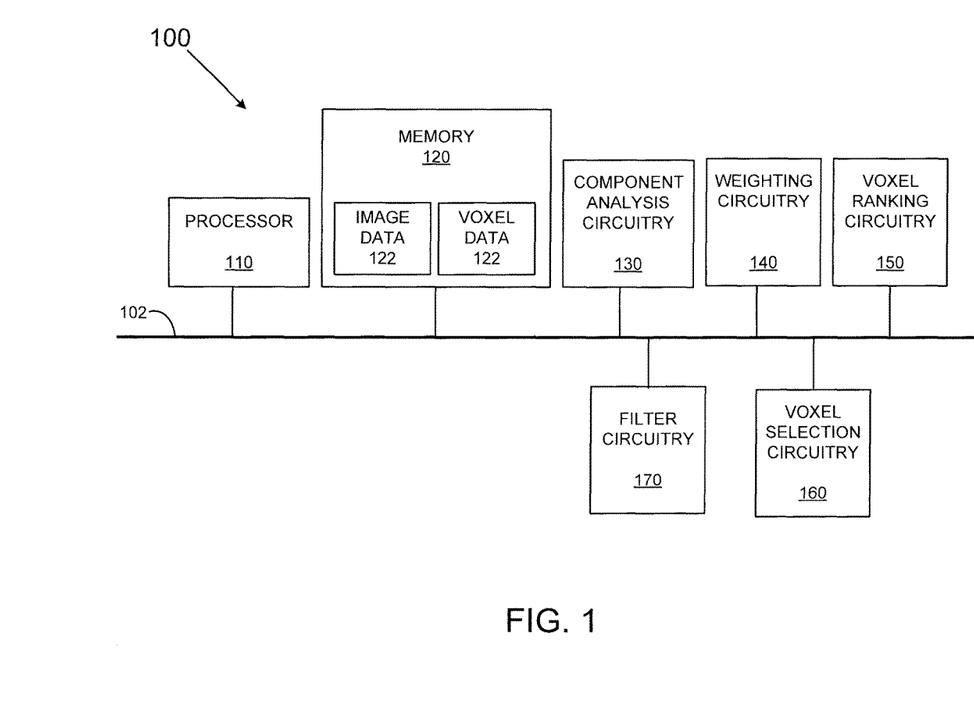
FIG. 1 is a block diagram of an example image-processing system.

FIG. 1 is an image-processing system 100 capable of taking stimulus image data and resultant voxel activity derived using fMRI measurements of human test subjects, then identifying a smaller (and more easily used) set of voxels that can be used to re-construct the images of the image data. The image-processing system 100 includes a processor 110, a memory containing image data 122 and corresponding voxel data 126, component analysis circuitry 130, weighting circuitry 140, voxel ranking circuitry 150, voxel selection circuitry, and filter circuitry 170. The above components 110-170 are connected by control/data bus 102. Although a bussed architecture is depicted in the example of FIG. 1, in other embodiments any or all of the various functional components 130-170 may be realized in other forms. For example, components 130-170 may be realized using dedicated processing electronics interconnected by separate control and/or data buses embedded in one or more Application Specific Integrated Circuits (ASICs).

In operation and under control of the processor 110, the component analysis circuitry 130 receives the image data 122, and subjects individual images in the image data 126 to some form of data reduction such that information in the individual images can be expressed in a relatively small number of vectors. For example, in one embodiment the component analysis circuitry 130 can perform a Principal Components Analysis (PCA)(i.e., to identify the eigenvectors of an image) or an Independent Component Analysis (ICA)(via Sejnowski's ICA implementation (See, Makeig, S., Bell A J, Jung T-P, Sejnowski T. J. (1996), *Independent component analysis of electroencephalographic data*, In: D. Touretzky, M. Mozer and M. Hasselmo (Eds). Advances in Neural Information Processing Systems 8:145-151, the content of which is incorporated by reference in its entirety)) to identify five to ten descriptive feature vectors containing co-varying features, while simultaneously minimizing covariance between bases. However, in other embodiments, the component analysis circuitry 130 may apply other existing or newly-developed forms of component analysis can be used to identify descriptive feature vectors as may be found useful or otherwise advantageous.

Once the component analysis is performed, the weighting circuitry 140 can weight the various vectors to create a loading matrix. Such a loading matrix can be constructed by projecting each component vector onto each image. The scalar product of the $i^{th}$ component onto the $j^{th}$ images can then be calculated and recorded as the $i$-$j^{th}$ entry of the loading matrix where after the loading matrix can be normalized for variance and stored.

In order to simplify model fitting, the voxel ranking circuitry 150 can then rank each voxel in terms of its variance, redundancy and/or information entropy. Ranking based on variance helps remove voxel activity that is more likely due to non-stimulus related factors, such as regular blood flow activity in the brain. Removing voxels based on redundancy is useful since, if two or more voxels contain highly correlated/redundant data, then processing more than one of these voxels is a waste of resources. Ranking based on information entropy is useful as it indicates which voxels are likely to provide the most useful information. Information Entropy is a concept of information theory that indicates how much information there is in an event or object. In general, the more new (or unique) information that an event/object provides, the higher the information entropy.

To perform entropy-based ranking, the voxel ranking circuitry 150 can perform a Bayesian regression, such as that outlined in Kuo and Mallick (Kuo, L. and Mallick, B. (1998), *Variable selection for regression models*, In Sankhya: The Indian Journal of Statistics, Special Issue on Bayesian Analysis. 60:B:1. 65-81.), the content of which is incorporated by reference in its entirety. Briefly put, the Kuo and Mallick approach uses an iterative Gibbs sampling procedure to fit principal component loadings for each component onto each voxel at each time step. For this procedure, the following equation is applied:

$$A_i(t)=\Sigma\gamma_{im}\Sigma\beta_{mj}S_j(t), \qquad \text{Eq}(1)$$

where $A_i$ represents the projection of the $i^{th}$ component onto the stimulus image presented at time t, $S_j$ represents the activity of voxel j at time t, $\gamma_{ij}$ is a binary selection vector (under a simple binomial prior, see Kuo and Mallick 1998 for details), and $\beta_{ij}$ is a matrix of regression coefficients.

In general practice, the voxel ranking circuitry 150 can perform between one-thousand (1,000) and ten-thousand (10,000) Gibbs samples. However, because of the large state space of variables fitted, identical γ matrices need only be produced relatively infrequently. As the voxel ranking circuitry 150 need only attempt to obtain a smaller and more manageable set of voxels, and not necessarily obtain the globally smallest set, the voxel ranking circuitry 150 may optionally rank the γ generated by the Gibbs sampling algorithm in order of its associated multivariate normal log-likelihood value, where after the voxels with the largest likelihood γ may be selected. In an actual experiment, ten iterations of model fitting were performed, and for each component, voxels that were selected by the γ vector were chose as particularly relevant and useful.

Once the voxel ranking circuitry 150 has ranked the individual voxels, the voxel selection circuitry 160 can select a set of N (where N is a positive integer) highest ranked voxels. In the present example, the top eighty (80) voxels were selected for performance analysis as will be discussed below with respect to FIGS. 4-11B.

Filter Creation:

A useful function of the image-processing system 100 is to identify a set of "filters" that could be applied to time-varying fMRI activity in order to optimally approximate/re-create the images presented to the subject(s). To do this, the filter circuitry 170 can apply an approach inspired by what is known as the "spike weighted averaging" technique. That is, assuming that feature-sensitive neurons contained in a given voxel fire maximally fire when their best-matched stimulus feature (e.g., an eye or a vertical line) is presented, a simple encoding of a stimulus image can be expressed by the following equation:

$$S=\Sigma_i\phi_i*r_i(t) \qquad \text{Eq}.(2)$$

where S is the stimulus image presented, φ the average filter response of the group of neurons in the voxel under consideration, and $r_i(t)$ is the variance-normalized average activity in a voxel at time step t.

It's possible for the filter circuitry 170 to isolate each filter by multiplying the stimulus S by rate $r_i(t)$ and integrating over time.

$$\phi_i=\int r_i(t)Sdt=\int r_i(t)\Sigma_i\phi_i*r_i(t)dt \qquad \text{Eq}.(3)$$

Figure 2:
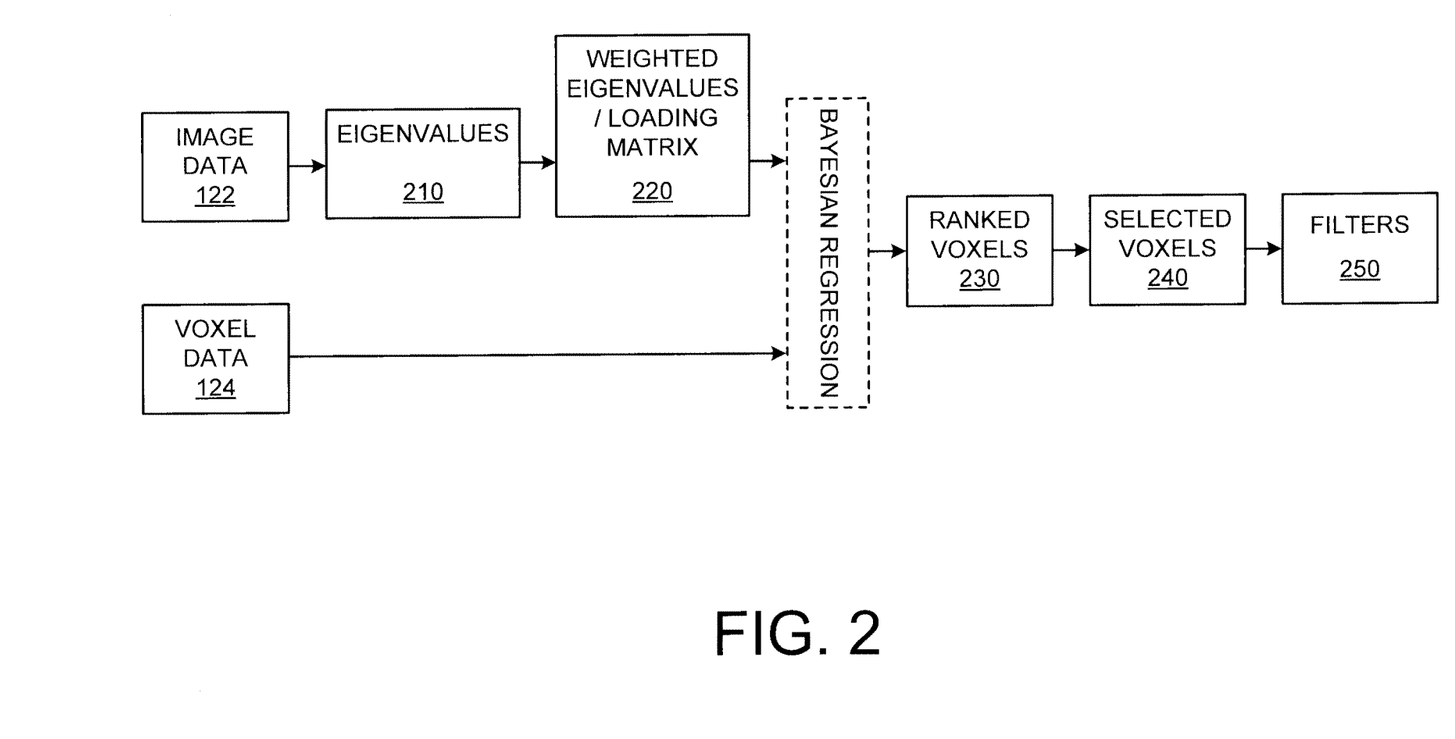
FIG. 2 depicts the data flow for the image processing system of FIG. 1.

FIG. 2 represents a possible flow of the data manipulation for the image-processing system 100 of FIG. 1. As shown in FIG. 2, the image data 122 of FIG. 1 is first reduced to a set of eigenvectors 210 using a PCA reduction. The eigenvectors 210 are then weighted to form a loading matrix 220. A Bayesian regression is then performed on individual voxel images against the loading matrix 220 to create a set of ranked voxels 230, again noting that such voxels are ranked according to information entropy. The top-ranked voxels are selected to form a set of selected voxels 240 where after a variety of filters 250 may be derived as outlined according to Equations (2)-(3) above.

Figure 3:
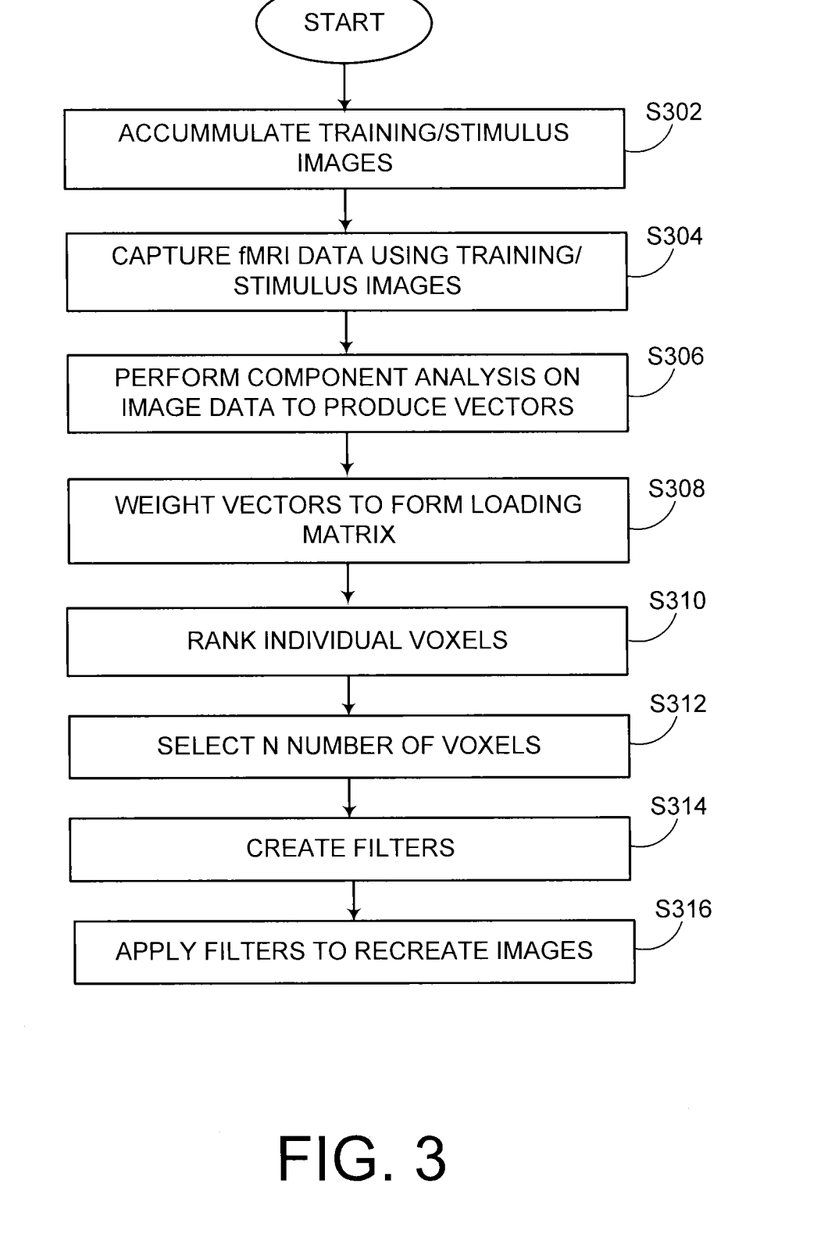
FIG. 3 is a flowchart outlining a set of example operations for reducing the number of voxels needed to recreate image data, create filters, and reconstruct images using voxel data.

FIG. 3 is a flowchart outlining an example process for selecting voxels and creating filters. It is to be appreciated to those skilled in the art in light of this disclosure that, while the various steps of FIG. 3 are shown according to a particular order for ease of explanation, that certain steps may be performed in different orders or in parallel.

The process starts in step S302, where a set of training/stimulus images, e.g., faces, animals, houses, etc., are accumulated. In S304, fMRI data is captured using the various training/stimulus images of step S302. In S306, a component analysis technique, such as the PCA and/or the ICA techniques described above, can be applied to create a number of vectors (e.g., five to ten vectors) representing the most prominent features of each image.

In step S308, the vectors of step S306 are weighted to form a loading matrix, and in step S310 individual voxels are ranked. As discussed above, voxels may be ranked based on information entropy by, for example: (1) a Bayesian regression of voxel images against some representation of corresponding image data, such as the loading matrix discussed above, (2) eliminating redundant voxels, and/or (3) discounting voxels having relatively high variances.

In step S312, a set of N voxels having the highest rankings are selected, and using the selected voxels, a series of filters may be created consistent with respect to Equations (2)-(3) above. Once the filters are created, the filters may be applied to the voxel responses of the training/stimulus images to re-create all or part of the images, or applied to voxel responses of new images in order to approximate the new images.

Figure 4:
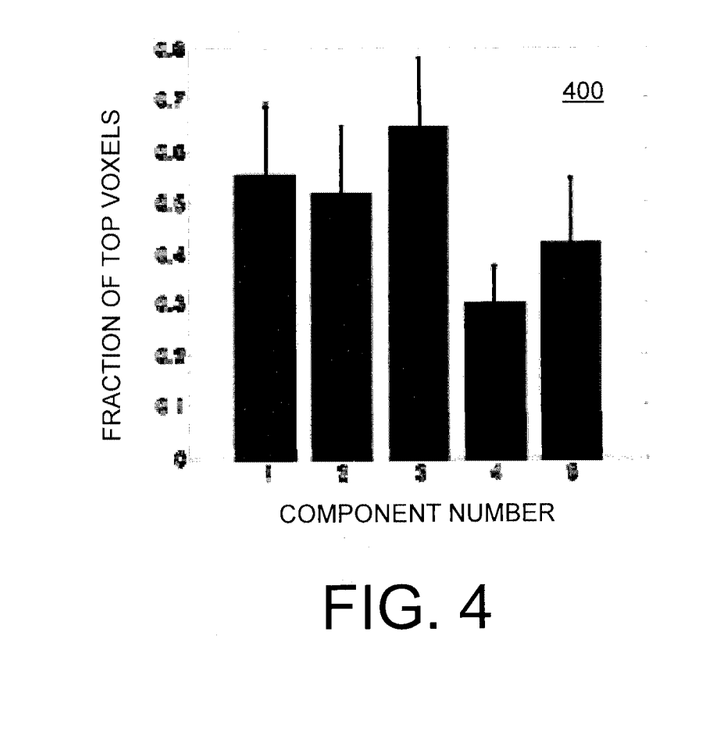

Experimental Results:

In an experiment involving the first data set of 18,063 voxels, the eighty (80) most informative voxels were selected according to their information entropy. FIG. 4 depicts a graph 400 that shows the results for ten distinct fits that were performed in order to assess the stability of voxel selection. In doing this, the number of voxels representing feature images were reduced by ~50% averaged over all components. That is, in practice, regressions required only about half of the top eighty voxels as ranked by information content.

Figure 5:
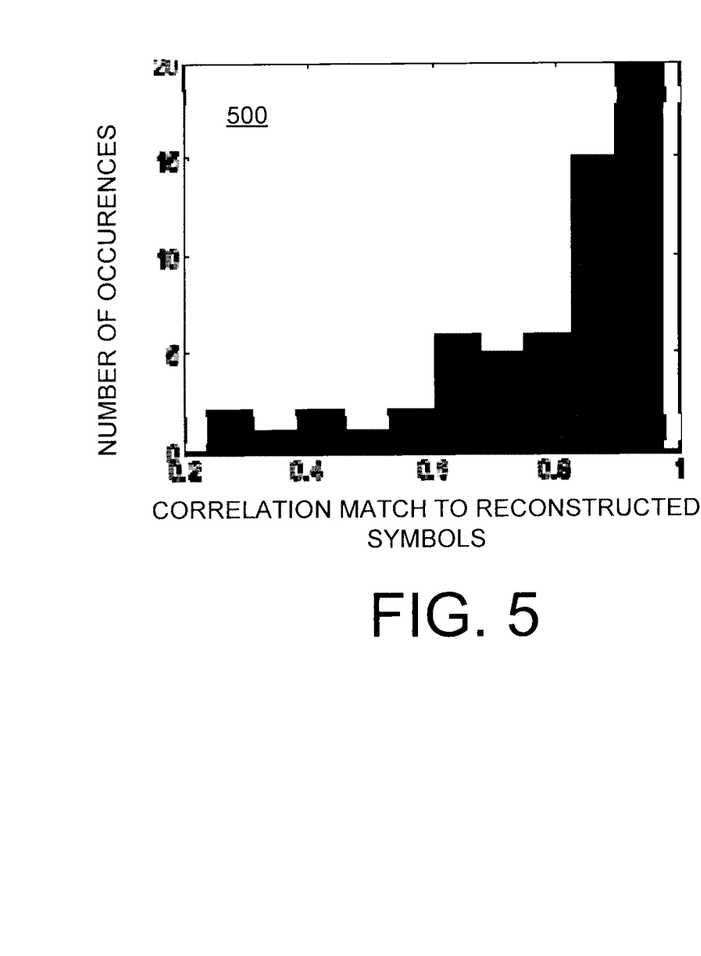

Continuing to FIG. 5, the graph 500 indicates that it was possible to reconstruct images using the only the selected voxels such that, for more than 60% of trials, the reconstructed images correlated to the original image with a factor greater than 0.8.

Figure 6:
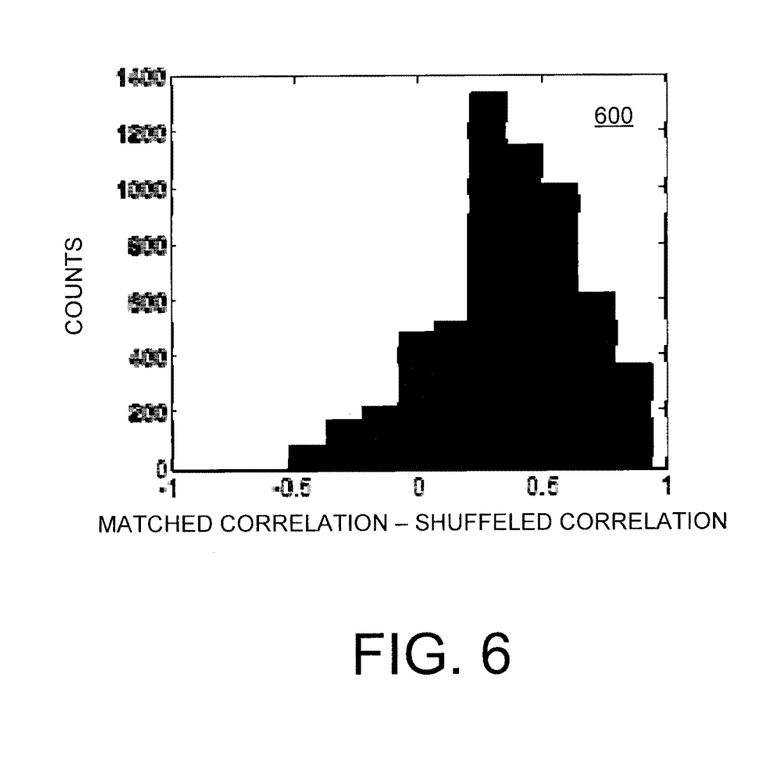

Continuing to FIG. 6 (graph 600), by comparing the fits against shuffled data it was found that the correlation between the test image and the reconstructed image was greater than the shuffled correlations for 89% of shuffles. It was further observed that a mere fourteen (14) voxels were identified as contributing to the principal components' activation on each of the ten model fitting runs.

Figure 7:
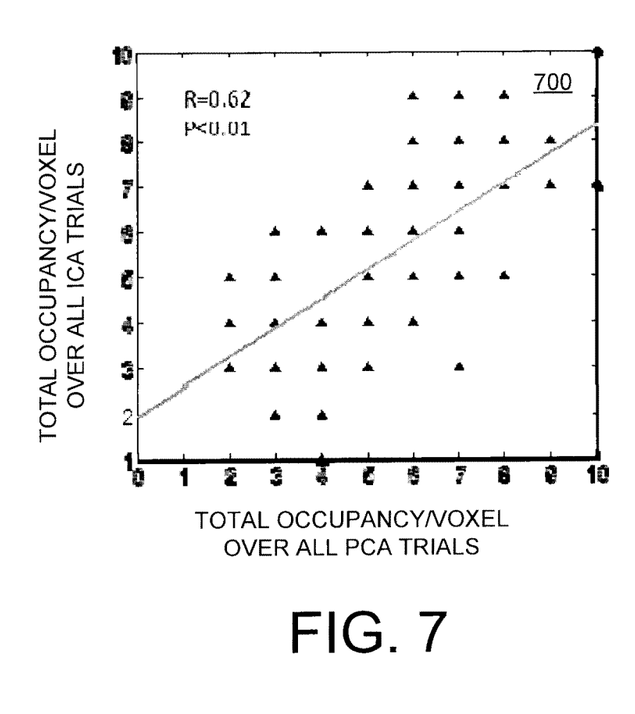

FIG. 7, graph 700, demonstrates that voxel selection derived by a PCA technique or an ICA results in very similar outcomes. This suggests that, while some forms of component analysis/data reduction may be more effective than others, a wide variety of different data reduction approaches will likely prove useful to some degree.

Taking the fourteen most highly relevant voxels identified from a PCA technique, the stimulus image presented at each time step was multiplied by the fMRI activation at the same time step. The products were then averaged over all time steps according to Eq. (2) above. The resultant mean activity being more than two standard errors above zero was regarded as significant, and a filter consisting of only "significant" contributions was retained. The result was surprising. Clear "part representations" emerged from this summing procedure. These "parts" represented the sensitivity filters $\phi$ from Equation (2).

Figure 8:
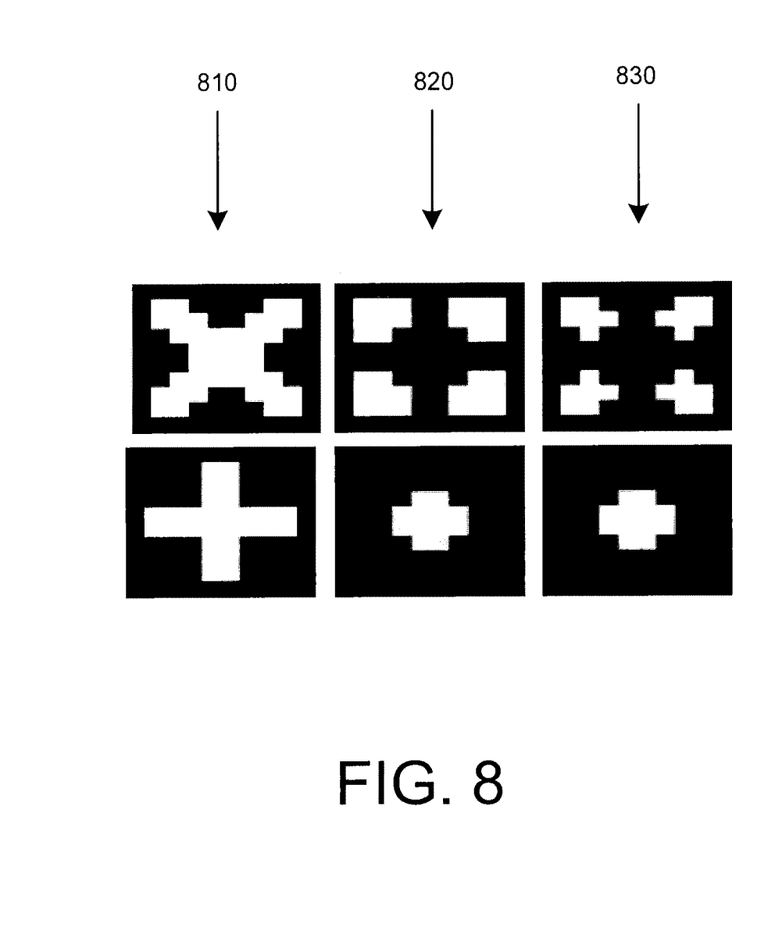

Continuing to FIG. 8, after each filter had been identified, all of the filters were multiplied by the corresponding time-varying voxel activity, and all filtered activity were summed to reconstruct an approximation of the original image set. Whole image data is represented in the first column 810. Reconstructions were all very good (>80%) using the fourteen (14) voxels identified above as shown in the second column (820) using PCA derived filters. Repeating the analysis for ICA-derived filters, results were entirely analogous (third column (830)) and similar to the PCA-derived filters.

Figure 9:
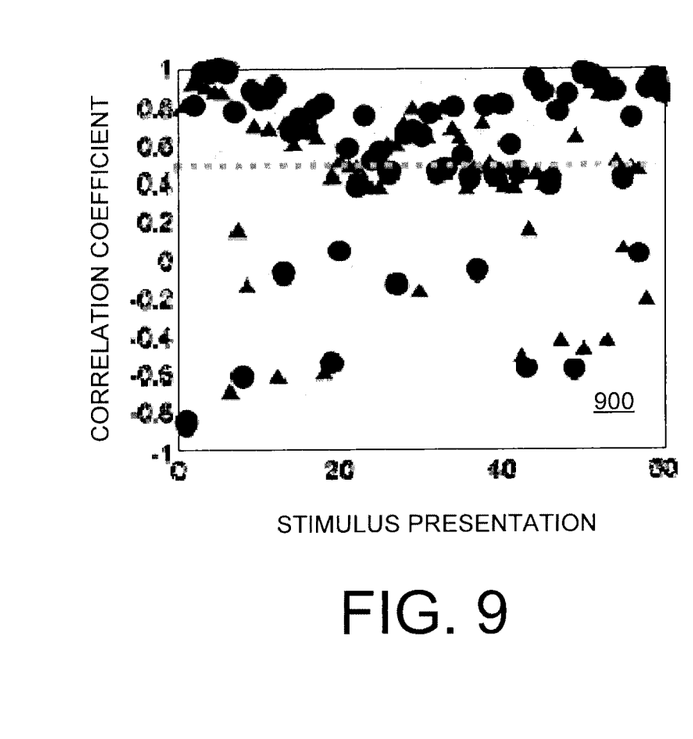

FIG. 9 (graph 900) depicts mean correlation coefficients estimated by the jackknife procedure. Results showed a greater than 95% correlation index for mean correlations between shuffled stimulus and reconstructed images (represented by the horizontal dotted line).

Applying the processes above for the second set of data (discussed above) presented additional challenges given there was considerable "label noise" in this data set. For example, one generally only knows that an image of a cat is being presented from among some set of possible cat images. The specific image is difficult to match. To address this issue, one need only to choose to use principal components from the first image in each category type as regressors against voxel activity so that at least once during each presentation of a group there is an actual match to the correct image.

Figure 10A:
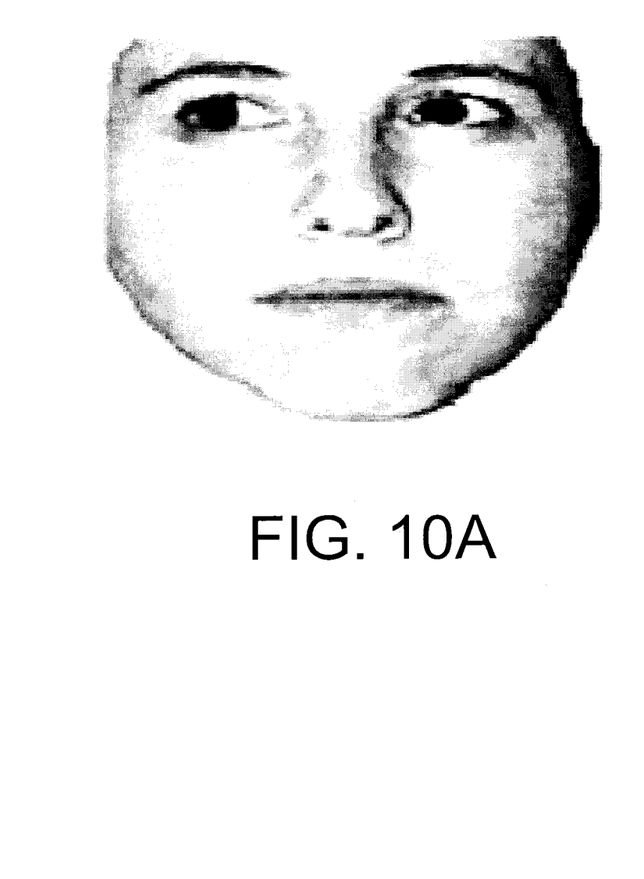
Figure 10B:
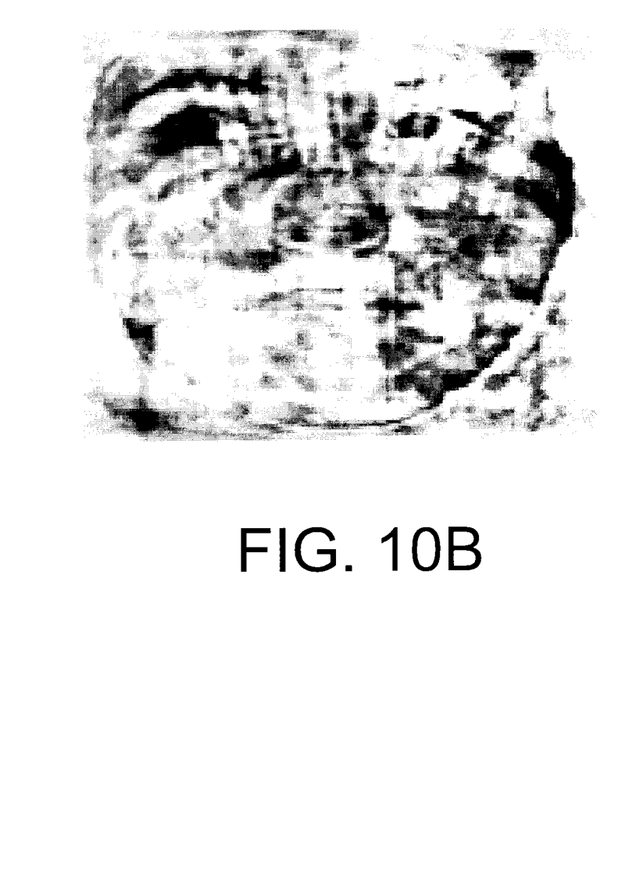

By taking the pseudo-inverse of estimates (see, Eq. (1)) made from the voxels and multiplying the first twelve (12) principal components through this matrix, accurate reconstructions of the fitted stimulus images could be readily made. For example, FIG. 10A is an actual image presented to a test subject used to elicit an fMRI response, with FIG. 10B showing a reconstructed version of FIG. 10A using less than 0.2 percent of available fMRI-measured voxels as a data set.

For regression fits to the five largest Principle Components (PCs or eigenvalues) or Independent Components (ICs)), the voxels that occurred in more than half of the ten trial fits were identified as the most informative voxels and retained for stimulus averaging as above. When voxel-weighted averaging was performed on the images based on the method outlined above, significant features could only be identified at a threshold of one standard deviation above the baseline. Due to the complication posed by label noise, rather than weighting a particular image by the corresponding voxel activation at that stimulus presentation time, all images of that class are averaged and then the corresponding average is weighted by the voxel activation. As can be seen from the following equation:

$$\varphi_i = \int r_i(t) \sum_{m=1}^{M} \frac{S_m}{M} dt = \int r_i(t) \sum_{m=1}^{M} \frac{(\varphi_m + error_m)}{M} r_i(t) dt \quad \text{Eq. (4)}$$

if the stimuli $S_m$ are largely uncorrelated, then it is still possible to identify a filter $\phi_m$ as the $error_m/M$ term will be small enough to neglect.

This procedure should result in a noisy, but potentially still discernible feature-selective filter(s), and experimentation showed that after many sums, image features begin to converge to basic facial features. As a check on this approach, (and due to the fact that facial images may exhibit significant correlation structure and therefore violate an assumption implicit in equation 4) when all face images were removed from the voxel-weighted averages, some basic facial features would still appear.

Figure 11A:
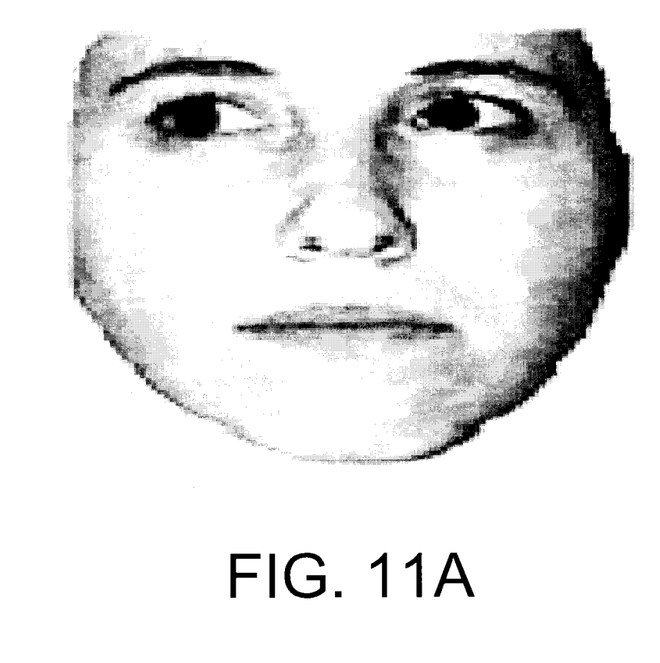
Figure 11B:
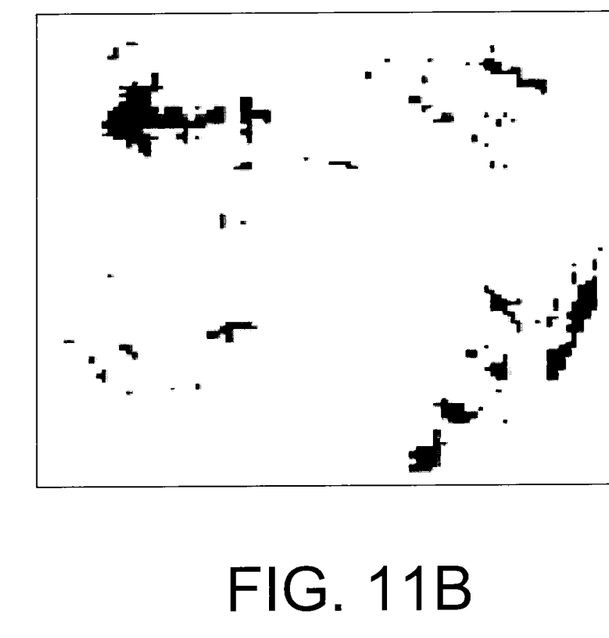

FIGS. 11A and 11B show that certain voxels may be used to identify highly specific portions of a picture. The re-created image of FIG. 11B is the result of a filter that was very sensitive to left eyes of a face image set.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A system for processing images, comprising:
voxel-ranking circuitry that ranks individual voxels using voxel data derived from physiological responses resulting from exposure to a plurality of corresponding baseline stimulus images;
voxel selection circuitry that selects a portion of the set of ranked voxels based on their rank; and
filter circuitry that creates two or more filters by determining which voxels will activate maximally in response to a feature presented in one or more stimulus images, then isolating each filter, the isolation of each filter based on the following equation:

$$\phi_i = \int r_i(t) S dt = \int r_i(t) \Sigma_i \phi_i * r_i(t) dt,$$

where $\phi_i$ represents an average filter response and expresses that a signal S is constructed from a weighted linear sum of neural firing rates, $r_i(t)$ represents variance-normalized average activity in a voxel at time step t, and S represents the stimulus image.

2. The system of claim 1, wherein:
the voxel-ranking circuitry ranks voxels based upon which voxels have a lowest variance.

3. The system of claim 1, wherein:
the voxel-ranking circuitry ranks voxels based upon information redundancy of a voxel as compared to other voxels.

4. The system of claim 1, wherein:
the voxel-ranking circuitry ranks voxels based upon information entropy of individual voxels.

5. The system of claim 4, further comprising:
component analysis circuitry that reduces each of the stimulus images used to create the voxel data to a set of vectors.

6. The system of claim 5, wherein the component analysis circuitry reduces each of the stimulus images using a Principal Components Analysis (PCA) technique so as to identify eigenvectors of an image.

7. The system of claim 6, further comprising:
weighting circuitry that weights the eigenvectors so as to form a loading matrix.

8. The system of claim 7, wherein the voxel ranking circuitry uses a Bayesian regression on the voxel data along with the loading matrix to rank voxels.

9. The system of claim 5, wherein the component analysis circuitry reduces each of the stimulus images using an Independent Component Analysis (ICA) technique so as to identify vectors of an image.

10. The system of claim 1, wherein the voxel ranking circuitry uses a Bayesian regression on the voxel data with stimulus image data to rank voxels.

11. The system of claim 10, wherein Bayesian regression conforms to the following equation:

$$A_i(t) = \Sigma \gamma_{im} \Sigma \beta_{mj} S_j(t),$$

where $A_j$ represents a projection of the $i^{th}$ component onto a stimulus image presented at time t, $S_j$ represents the activity of voxel j at time t, $\gamma_{ij}$ is a binary selection vector, and $\beta_{ij}$ is a matrix of regression coefficients.

12. A method for processing images, comprising:
ranking individual voxels using voxel data derived from physiological responses resulting from exposure to a plurality of corresponding baseline stimulus images;
selecting a portion of ranked voxels based on their rank, and
creating two or more filters by determining which voxels will activate maximally in response to a feature presented in one or more stimulus images, then isolating each filter, the isolation of each filter based on the following equation:

$$\phi_i = \int r_i(t) S dt = \int r_i(t) \Sigma_i \phi_i * r_i(t) dt,$$

where $\phi_i$ represents an average filter response and expresses that a signal S is constructed from a weighted linear sum of neural firing rates, $r_i(t)$ represents variance-normalized average activity in a voxel at time step t, and S represents the stimulus image.

13. The method of claim 12, wherein:
ranking individual voxels is based upon which voxels have a lowest variance and/or information redundancy as compared to other voxels.

14. The method of claim 12, wherein:
ranking individual voxels is based upon information entropy of individual voxels.

15. The method of claim 14, further comprising:
reducing each of the stimulus images to a set of vectors.

16. The method of claim 15, wherein reducing each of the stimulus images is based on at least one of a Principal Components Analysis (PCA) technique or an Independent Component Analysis (ICA) technique so as to identify vectors of an image.

17. The method of claim 16, further comprising:
weighting the vectors so as to form a loading matrix.

18. The method of claim 17, wherein the Bayesian regression technique conforms to the following equation:

$$A_i(t) = \Sigma \gamma_{im} \Sigma \beta_{mj} S_j(t),$$

where $A_i$ represents a projection of the $i^{th}$ component onto a stimulus image presented at time t, $S_j$ represents the activity of voxel j at time t, $\gamma_{ij}$ is a binary selection vector, and $\beta_{ij}$ is a matrix of regression coefficients.

19. The method of claim 12, wherein ranking individual voxels includes applying a Bayesian regression technique on the voxel data with stimulus image data.

* * * * *